US006706847B2

(12) United States Patent
Davis et al.

(10) Patent No.: US 6,706,847 B2
(45) Date of Patent: Mar. 16, 2004

(54) COPOLYCARBONATE COMPOSITIONS, AND RELATED ARTICLES AND PROCESSES

(75) Inventors: Gary Charles Davis, Albany, NY (US); Rein Mollerus Faber, Begen op Zoom (NL); Jan-Pleun Lens, Breda (NL); Kathryn Lynn Longley, Saratoga Springs, NY (US); Marc Brian Wisnudel, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/104,629

(22) Filed: Mar. 22, 2002

(65) Prior Publication Data

US 2003/0187180 A1 Oct. 2, 2003

(51) Int. Cl.[7] ............................................. C08G 64/00
(52) U.S. Cl. .................. 528/196; 362/273; 369/283; 369/288; 428/64.1; 428/64.4; 428/64.6; 428/64.7; 428/913; 430/270.1; 430/495.1; 430/945; 525/461; 525/462; 528/198
(58) Field of Search .................. 528/196, 198; 362/273; 428/64.1, 64.6, 64.7, 64.4, 913; 430/270.11, 495.1, 945, 270.1; 369/283, 288; 525/461, 462

(56) References Cited

U.S. PATENT DOCUMENTS

| 3,989,672 A | 11/1976 | Vestergaard |
| 4,446,285 A | 5/1984 | Mark et al. ................. 525/439 |
| 4,469,861 A | 9/1984 | Mark et al. ................. 528/196 |
| 4,695,620 A | 9/1987 | Masumoto et al. |
| 5,137,971 A | 8/1992 | Dujardin et al. |
| 5,897,814 A | 4/1999 | Niemeyer et al. |
| 6,150,493 A | 11/2000 | Hait et al. |
| 6,262,218 B1 | 7/2001 | Inoue et al. |
| 6,436,503 B1 * | 8/2002 | Cradic et al. .............. 428/64.1 |
| 6,492,486 B1 * | 12/2002 | Mahood ..................... 528/196 |
| 6,537,636 B1 * | 3/2003 | Wisnudel et al. .......... 428/64.1 |

FOREIGN PATENT DOCUMENTS

| JP | 6228296 | 8/1994 |
| JP | 9183892 | 7/1997 |
| WO | WO97/22649 | 6/1997 |

OTHER PUBLICATIONS

WO9722649, Dec. 11, 1996. Abstract only.
JP6303629, Apr. 20, 1988. Abstract only.
JP8104747, Oct. 4, 1994. Abstract only.
International Search Report mailed Jun. 10, 2003.
JP6136249, May 17, 1994. Abstract only.

* cited by examiner

*Primary Examiner*—Terressa Boykin

(57) ABSTRACT

A thermoplastic composition is described, based on a copolycarbonate which includes at least two structural units. Structure I is usually a conventional carbonate based on bisphenol A, while structure II is a bisphenol carbonate which includes branched or linear groups extending from a bridging carbon atom or carbon group which connects two aromatic rings. The compositions exhibit very good melt flow, along with enhanced shear-thinning behavior. These characteristics are important for optical disc applications. Thus, related articles are described, along with processes for preparing such articles.

34 Claims, 1 Drawing Sheet

COPOLYCARBONATE COMPOSITIONS, AND RELATED ARTICLES AND PROCESSES

TECHNICAL FIELD

The present invention generally relates to thermoplastic materials. Some particular embodiments of the invention are directed to copolycarbonates having improved flow properties under industrial molding conditions.

BACKGROUND OF THE INVENTION

Thermoplastic polymers have many desirable properties that make them useful in molding applications. Polycarbonates are excellent examples of such materials—especially polycarbonates based on bisphenol A (BPA). These resins possess properties such as strength, toughness, heat resistance, chemical resistance, and optical clarity. They can also be modified or blended to enhance their melt flow characteristics. Thus, polycarbonates are often the materials of choice for many injection molding applications.

One such application of great interest over the last decade is optical media, e.g., compact discs (CD's) and digital versatile discs (DVD's). This type of media contains optically-encoded digital information. The physical structure of the disc is usually composed of polycarbonate material. The disc is fabricated by injecting-molding molten polycarbonate into a cavity where micro-pits are formed. The micro-pits represent encoded information, and are usually arranged in a spiral data track. The side where the micro pit track has been formed is coated with a thin layer of deposited metal (e.g., aluminum), to make the surface reflective.

The polycarbonate material serves as both a support structure and an optical window, through which a laser is focused on the reflective layer containing the data tracks. Each pit in the track varies in length according to the encoded digital data. Depending on whether the laser light is scattered or reflected back is related to pit presence and length, and provides the basis for recovering a digital data stream which represents the desired recorded information.

Electronics companies continually strive to incorporate greater amounts of information into optical discs. New formats to satisfy this need have been developed and refined, such as DVD-recordable (DVD-R), DVD-rewritable, high-density DVD, and digital video-recordable (DVR). The formats may include multiple information layers and/or shorter-wavelength lasers. The discs themselves must continue to reliably possess certain attributes, such as dimensional stability, high replication (i.e., precise replication from a stamper), and minimal birefringence levels.

In some instances, BPA polycarbonates do not fully meet the requirements for current disc formats, or for discs being developed for next-generation optical storage. For example, these conventional polycarbonates typically have high melt viscosities, which can impede melt flow. Insufficient melt flow during molding (e.g., injection molding) can lead to decreased pit or groove replication and/or longer molding cycle times. Moreover, while BPA polycarbonates do not typically absorb a great deal of water or moisture, they still may not meet the lower water-absorption requirements for more advanced optical disc applications.

It should therefore be apparent that some improvement in polycarbonate compositions would be welcome in the art. The compositions should exhibit lower viscosities at molding temperatures, as compared to conventional, bisphenol A-type polycarbonate compositions. Moreover, there should preferably be some improvement in terms of low water absorption. Furthermore, these improvements should be accompanied by the retention of other physical properties for the compositions, such as good impact strength, relatively high glass transition temperatures, and optical clarity.

SUMMARY OF THE INVENTION

A primary embodiment of the present invention is directed to a thermoplastic composition, comprising a copolycarbonate, i.e., a polycarbonate copolymer. The copolymer includes at least two structural units, I and II, which are described in detail below. In some preferred embodiments, structure I is a bisphenol A carbonate. Structure II is a bisphenol carbonate which includes branched or linear groups extending from a bridging carbon atom or carbon group which connects two aromatic rings. In preferred embodiments, the copolymer includes at least about 30 molar percent of structural unit I, based on the total molar weight of I and II. The thermoplastic composition can also include a variety of other additives.

The copolycarbonates of this invention can be prepared by various processes. Examples include melt polymerization and interfacial polymerization. They can also be prepared by a reactive blending process, as described below.

As described herein, the claimed copolycarbonates exhibit very good melt flow, along with enhanced shear-thinning behavior. These characteristics improve the molding capabilities of the compositions—especially for demanding applications such as optical disc fabrication. Moreover, the compositions substantially retain other attributes which are important for various end uses, e.g., low moisture uptake, good impact strength, relatively high glass transition temperatures, and optical clarity. Thus, articles made from the compositions (such as optical discs) constitute another aspect of this invention.

An additional embodiment of the invention is directed to a process for molding thermoplastic articles, comprising the following steps. In the first step of the process, a copolycarbonate resin is formed, comprising structural units (I) and (II). The copolycarbonate resin is then formed into an article by a molding process, such as injection molding.

Further details regarding the various features of this invention are found in the remainder of the specification.

DETAILED DESCRIPTION OF THE INVENTION

Figure 1:
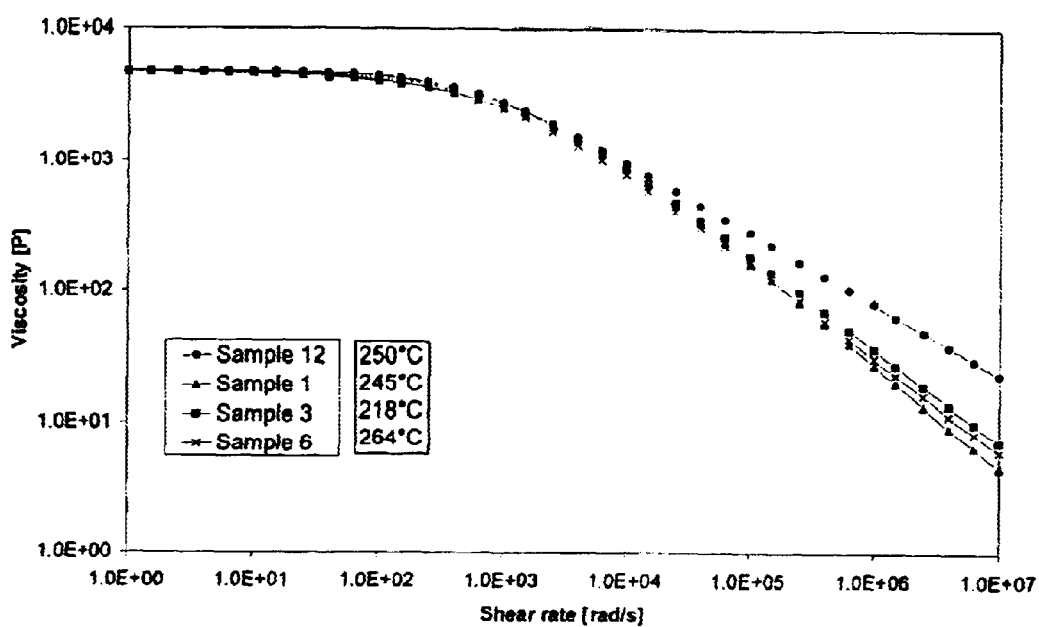
FIG. 1 is a graph depicting viscosity as a function of shear rate, for various polymeric samples within and outside the scope of this invention.

The copolycarbonate of the present invention includes the structural unit

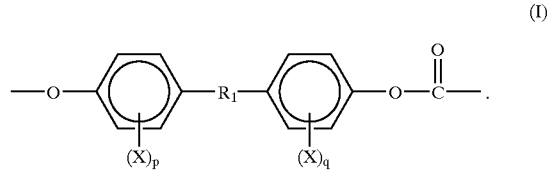

(I)

In this formula, $R_1$ is a divalent aliphatic, alicyclic, or phenyl-substituted alkylidene group; —O—, —S—, —SO—, —SO$_2$—, or CO. In preferred embodiments, R$_1$ is a hydrocarbon group. Examples include saturated groups like methylene, cyclohexylmethylene, 2-[2.2.1]-bicycloheptylmethylene; ethylene, isopropylidene, neopentylidene, cyclohexylidene, cyclopentadecylidene, cyclododecylidene, and adamantylidene.

Each "X" independently represents halogen (e.g., bromine, fluorine, or iodine), or a lower alkyl group. As used herein, "lower alkyl" refers to groups containing 1 to about 6 carbon atoms. The subscripts p and q are each, independently, 0 to 4. When X is alkyl, p and q are usually 0, 1, or 2. In many preferred embodiments, p and q are each zero, i.e., there are no "X" groups attached to the aromatic rings shown for structure I. (Some of the possible dihydric phenol compounds which constitute part of structural unit I of this invention are also described in U.S. Pat. No. 4,695,620, which is incorporated herein by reference.)

In some preferred embodiments of this invention, R$_1$ is isopropylidene. In such an instance (and in the absence of any X groups), structure I is a carbonate unit derived from bisphenol A. These types of carbonate units are well-known in the art. Methods for preparing and using bisphenol A are also very familiar to those in the polymer arts.

As also mentioned above, the copolycarbonate of the present invention further includes the structural unit

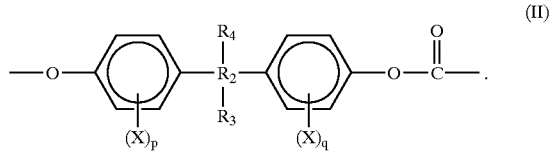

(II)

R$_2$ for this formula is a bridging hydrocarbon group containing 1 to 3 carbon atoms. Moreover, each R$_3$ and R$_4$ group is, independently, hydrogen, or a branched or linear alkyl group. As used herein in reference to R$_3$ and R$_4$, the term "alkyl" is meant to include alkyl chains which may also include other functional groups, such as ester groups or ether groups. One example is mentioned below, i.e., the methyl ester of 4,4-bis(4-hydroxyphenyl)valeric acid.

The R$_3$ and R$_4$ groups each contain 2 to about 40 carbon atoms. For the purposes of the present invention, only one of the R$_3$ and R$_4$ groups can be hydrogen. Furthermore, one of the R$_3$ and R$_4$ groups must contain at least two carbon atoms. As in the case of structure I, "X" in this instance represents halogen or a lower alkyl group. The subscripts p and q are, each, independently, 0 to 4. When X is alkyl, p and q are usually 0, 1, or 2. In many instances, p and q are each zero.

Examples of the R$_2$ groups include:

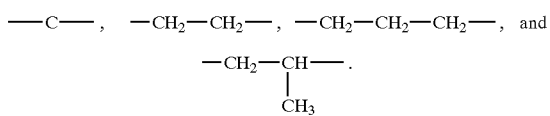

In preferred embodiments, R$_2$ is methylene.

Preferably, at least one of R$_3$ and R$_4$ is an alkyl group containing about 2 to about 10 carbon atoms. As mentioned above, the groups can be linear or branched, and may contain other functionalities. They are usually (but not always) unsubstituted. The R$_3$ and R$_4$ groups provide the pendant carbon chains required for the present invention. The desired content of each group will depend on various characteristics desired for the copolycarbonate composition itself. Exemplary factors relate to melt viscosity, glass transition temperature (Tg), impact strength, optical characteristics, cost, and the like.

In some preferred embodiments of the present invention, structure II is a carbonate unit derived from a bisphenol selected from the group consisting of 3,3-bis(4-hydroxyphenyl)pentane ("C05"); 2,2-bis(4-hydroxyphenyl)-4-methylpentane ("C06"); 1,1-bis(4-hydroxyphenyl)decane ("C10"); 1,1-bis(4-hydroxyphenyl) nonane; 1,1-bis(4-hydroxyphenyl)isononane; 1,1-bis(4-hydroxyphenyl)-2-ethylhexane; 2,2-bis(4-hydroxyphenyl) butane; and the methyl ester of 4,4-bis(4-hydroxyphenyl) valeric acid:

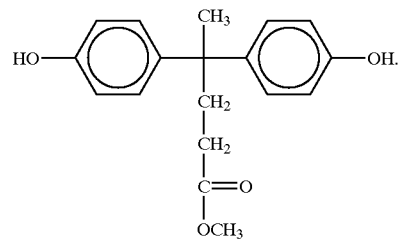

The bisphenols for structure II are commercially available, or can be prepared without undue effort, e.g., from selected aldehydes or ketones. Similar bisphenols can be easily prepared from other aldehydes or ketones which are readily available. Selection of the most appropriate bisphenol will depend on the factors described previously. (The terms "aromatic dihydroxy compounds" or "dihydric phenols" are sometimes used interchangeably herein to describe the bisphenols of interest).

The proportion of structural unit I to structural unit II for the present invention will again depend on the performance and cost factors described above. As a general rule, the proportionate amount of structural unit II is increased when greater melt flow and lower water absorption is desired for the final product. Usually, the amount of structural unit I which is present is at least about 30 molar percent, based on the total moles of structural unit I and structural unit II. In preferred embodiments, the amount of structural unit I is at least about 50 molar percent.

In many instances, cost and performance considerations require substantial levels of structural unit I—especially when the structure represents bisphenol A-carbonates. Thus, in some especially preferred embodiments, the amount of structural unit I ranges from about 80 molar percent to about 99 molar percent, while the amount of structural unit II ranges from about 1 molar percent to about 20 molar percent. The most appropriate amounts of both carbonate materials can also be determined empirically, e.g., by experimental testing, as illustrated in the examples which follow.

The molecular weight of the copolycarbonate will depend in large part on the desired physical properties for the composition. Usually, the molecular weight will range from about 10,000 to about 100,000. (Weight averages are used, as compared to a polystyrene standard). Higher values within this range usually provide greater ductility and strength, while lower values provide better melt flow. In some preferred embodiments, the molecular weight will range from about 25,000 to about 40,000. Conventional molecular weight-controlling agents may sometimes be used—especially when an interfacial process (as discussed below) is used to prepare the product. Examples include phenol and para-cumyl phenol.

The end-cap level is also a factor in preparing the copolycarbonates of this invention. Usually, the end-cap level of the copolymer is at least about 75%, and preferably, at least about 85%. A higher end-cap level (i.e., a greater proportion of free hydroxyl groups capped) provides greater hydrolytic stability. This consideration is sometimes important for articles which have very strict dimensional requirements, e.g., optical discs. In some especially preferred embodiments, the end-cap level is at least about 95%.

The type of polymerization process used for the copolycarbonate may determine end-cap level. For example, an interfacial process typically provides very high end-cap levels, e.g., greater than about 95%. In the case of a melt-polymerization process (also discussed below), a desired end-cap level can be achieved in a number of ways. For example, adjustment of the stoichiometry between the carbonate source and the bisphenol can provide the desired level. In general, increasing the ratio of carbonate to bisphenol will increase the end-cap level. Conventional end-capping agents could also be employed, such as the alkyl phenolic compounds.

Compositions of this invention may include one or more of a wide variety of additives. All of them are known in the art, as are their general levels of effectiveness. Non-limiting examples include impact modifiers (e.g., ABS resins), antioxidants, nucleating agents, mineral fillers such as talc, clay, mica, barite, and wollastonite; stabilizers such as (but not limited to) thermal- and UV stabilizers; reinforcing fillers such as flaked or milled glass; flame retardants, pigments and other colorants; and lubricants and other processing aids. Those of ordinary skill in the polymer arts will be able to determine the most effective level of each additive, without undue effort.

The copolycarbonates of the present invention can be prepared by various methods. Examples include: melt polymerization, interfacial polymerization, solid state polymerization, and interfacial conversion to bischloroformates, followed by polymerization. General details regarding all of these processes are known in the art. As an example, U.S. Pat. No. 3,989,672 describes the interfacial process, in which an aromatic dihydroxy compound (such as bisphenol A) is reacted with a carbonyl compound such as phosgene. This patent is incorporated herein by reference. Details regarding polycarbonate polymerization can also be found in "Organic Polymer Chemistry", by K. Saunders, which is also incorporated herein by reference.

In the present instance, at least two of the aromatic dihydroxy compounds would be reacted with the carbonyl compound, as described in some of the examples in this specification. The reaction usually takes place in an organic solvent such as methylene chloride, into which the carbonyl chloride is passed. Tertiary amines such as triethylamine, or a quaternary ammonium base, are typically added to the reaction system as a catalyst.

Melt processes (sometimes referred to as "transesterification" or "ester interchange") are preferred for many embodiments of this invention. These techniques are described, for example, in U.S. Pat. No. 6,262,218, which is incorporated herein by reference, as well as in the Saunders text mentioned above. Typically, a diaryl carbonate is reacted with at least one dihydric phenol (i.e., an aromatic dihydroxy compound) in the presence of a basic catalyst. Examples of the catalysts include alkali metal hydroxides (e.g., NaOH), lithium hydride, zinc oxide, antimony oxide, and ammonium hydroxides. Usually, the diaryl carbonate (sometimes referred to as a "carbonic acid diester") is diphenyl carbonate. The dihydric phenol in this instance includes those upon which structural units (I) and (II) (as described previously) are based.

As one non-limiting illustration, the melt polymerization can be carried out by initially melting and agitating the reactants at about 140° C. to about 180° C., under nitrogen. The temperature is then raised over a period of time, while the pressure is reduced. After most of the phenol has been distilled off, the reaction mixture is heated for a further period, with increasing temperature (e.g., to about 300° C.) and decreasing pressure (e.g., to about 1 mm Hg). The melt becomes increasingly viscous, and the reaction is stopped while the material can still be forced from the reactor under inert gas pressure. The extruded product can then be pelletized.

As another alternative, the copolycarbonates can be prepared by a reactive blending process. Such a technique (sometimes referred to as "reactive extrusion") involves the blending of a homopolycarbonate of structural unit I with a homopolycarbonate of structure II. Reactive blending is known in the art, and described, for example, in U.S. Pat. No. 6,150,493 (Hait et al) and U.S. Pat. No. 5,137,971 (Dujardin et al), both of which are incorporated herein by reference. Aspects of reactive blending are also described in J. Appl. Polym. Sci., 30, 1267 (1985); Plastics Engineering, 52, 621 (1999); J. Appl. Polym. Sci., 55, 1157 (1995); and Japanese Patent JP 9-183892 (Jul. 15, 1997). The blending is undertaken in the presence of a catalyst which will promote the ester interchange reaction. Non-limiting examples of suitable catalysts are Lewis acid-type catalysts (e.g., dibutyltin oxide, titanium alkoxides), alkali metals, alkaline earth metals, and the like.

The temperature for reactive blending will depend on various factors, such as the particular types and molecular weights of the homopolycarbonates. In some embodiments, the homopolycarbonates are melt-blended in the barrel of an extruder, in the presence of the catalyst. The resulting product is a copolymer, in which both co-monomers are incorporated into one polymer chain.

In some preferred embodiments for optical disc applications, the compositions of this invention can be characterized in terms of various physical properties. As an example, the compositions, which include both structural units (I) and (II), are often characterized by:

a glass transition temperature (Tg) in the range of about 120° C. to about 185° C.;

a water absorption value of below about 0.33 weight %;

a melt flow value which is at least about 10% higher, and preferably, at least about 25% higher, than a melt flow value for a polycarbonate comprising only structural unit (I), at substantially the same molecular weight; and a melt viscosity value which is at least about 10% lower than the melt viscosity value for a polycarbonate comprising only structural unit (I), at a shear rate of at least about $1.0 \times 10^4$ rad/s, under the same constant zero shear rate (CZSR) conditions.

Another embodiment is directed to articles made with the compositions described herein. Typically, the articles are molded by conventional techniques. Molding processes are enhanced to some degree by this invention, since these compositions desirably exhibit relatively low viscosities at molding temperatures. Moreover, the articles exhibit other important attributes, such as low water-absorption, good impact strength, relatively high glass transition temperatures, and optical clarity (when desired).

An article of particular interest for this invention is an optical disc, as discussed previously. Usually, the optical discs are injection-molded, using pellets of the thermoplastic composition. Injection molding techniques are well-known in the art. Those of ordinary skill can adapt those techniques to the compositions described herein. As one non-limiting example, U.S. Pat. No. 5,897,814 (Niemeyer et al, assigned to General Electric Company) discusses various details regarding injection molding of optical discs. This patent is incorporated herein by reference.

EXAMPLES

The examples which follow are merely illustrative, and should not be construed to be any sort of limitation on the scope of the claimed invention. The following measurements were made in these examples:

a) Molecular weight (weight average and number average) were measured by GPC analysis of 1 mg/ml polymer solutions in methylene chloride, versus polystyrene (PS) standards.

b) Copolycarbonate composition was determined by NMR spectroscopic analysis.

c) Glass transition temperature (Tg) values were determined by differential scanning calorimetry, using a Perkin Elmer DSC7. The Tg was calculated, based on the "½ Cp" method (heat capacity at constant pressure), using a heating ramp of 20° C./minute.

d) Melt Volume Index was measured with standard equipment (250° C., 1.25 kg load).

e) Rheological properties of the copolymer and polymers were measured, using a standard plate-plate rheometer.

f) Water absorption (% $H_2O$) was determined by the following method, which is similar to ASTM D570, but modified to account for the variable thickness of the parts described in the examples. The plastic part or disk was dried in a vacuum for over 1 week. The sample was removed periodically and weighed to determine if it was dry (i.e., if it stopped losing mass). The sample was then removed from the oven and allowed to equilibrate to room temperature in a desiccator. The dry weight was recorded.

The sample was then immersed in a water bath at 23° C. The sample was removed periodically from the bath; the surface was blotted dry, and the weight recorded. The sample was repeatedly immersed and weighed, until it became substantially saturated. The sample was considered substantially saturated or at "equilibrium" when the increase in weight in a 2 week-period averaged less than 1% of the total increase in weight (as described in ASTM method D-570-98, section 7.4).

g) $C_g$ values (Birefringence/stress optical coefficient) were determined as follows: The polymer (7.0 grams) was charged to a heated mold having dimensions of 5.0 inches× 0.5 inch (12.7×1.3 cm). The polymer material was then compression-molded at 120° C. above its glass transition temperature. During molding, the polymer was subjected to applied pressure, beginning at 0 pounds and ending at 2000 pounds (908 kg). A standard compression molding device was used. After the required amount of time under these conditions, the mold was allowed to cool, and the molded test bar was removed. The bar was then inspected under a polaroscope, and an observation area on the test bar was located. Selection of the observation area was based on the lack of birefringence observed. The area was a sufficient distance from the ends or sides of the test bar.

The sample was then mounted in a device designed to apply a known amount of force vertically along the bar, while the observation area of the bar was irradiated with appropriately polarized light. The bar was then subjected to six levels of applied stress. The birefringence at each level was measured with the aid of a Babinet compensator. Plotting birefringence versus stress provided a curve having a slope which was equal to the stress optical coefficient $C_g$.

Small Scale Melt Polymerization

Reactions were carried out on a small scale, using bisphenol A and various levels (in mole percent) of co-monomers. The reactions were carried out in glass reactors which were passivated by acid-washing. In this case, "mole percent" is defined as 100×(mole co-monomer/(total moles bisphenol)). The total amount of diphenyl carbonate (moles) was equal to 1.08×(bisphenol A+co-monomer (in moles)). The amount of diphenyl carbonate was held constant at 25 g in each reaction.

The catalysts employed were TMAH (tetramethylammonium hydroxide) and sodium hydroxide. The level of TMAH was $2.5 \times 10^{-4}$ mole per mole, based on the total amount of bisphenol A and co-monomer. The level of sodium hydroxide was $1.5 \times 10^{-6}$ mole per mole, based on total bisphenol A and co-monomer. Each catalyst was added as an aqueous solution (100 µl). The reactions were carried out by mixing the bisphenols with diphenyl carbonate. After the reactor system was nitrogen-purged, the polymerizations were carried out according to the following scheme:

TABLE 1

| Reaction Stage | t/min | T/° C. | P/mbar |
|---|---|---|---|
| 1 | 10 | 180 | atm |
| 2 | 60 | 230 | 170 |
| 3 | 30 | 270 | 20 |
| 4 | 30 | 300 | 0.5–1.6 |
| 5 | 30 | 300 | 0.5–1.6 |

At the end of the reaction, the reactor was brought back to atmospheric pressure with a gentle nitrogen flow. A quencher was added, and the polymer was recovered.

Large Scale Melt Polymerization

A bisphenol A (BPA) polycarbonate homo-polymerization was carried out in a stainless steel reactor capable of producing 1 kg of polymer starting from 1376 g diphenyl carbonate (DPC). A DPC/BPA molar ratio of 1.08 was used. Catalytic amounts of sodium hydroxide (NaOH) ($1.5 \times 10^{-6}$ mole/mole BPA) and TMAH ($2.45 \times 10^{-6}$ mole/mole BPA) were added in aqueous solution (550 µl) to the starting materials. After deoxygenation of the reactor content, the mixture was polymerized, using the reaction scheme outlined in the following table:

TABLE 2

| Reaction Stage | t/min | T/° C. | P/mbar |
|---|---|---|---|
| 1 | 30 | 230 | atm |
| 2 | 60 | 230 | 170 |
| 3 | 30 | 270 | 20 |
| 4 | 30 | 300 | 0.5–1.6 |

At the end of the final stage, the reactor was brought back to atmospheric pressure. Subsequently, 500 µl of a 0.09M n-butyl tosylate quencher solution (in toluene) was carefully added to the polymer mixture. The mixture was then allowed to stir for an additional 15 minutes. Finally, the polymer was stranded and granulated.

Example 1

In this example, a batch reactor tube was charged under nitrogen with 23.7 g of BPA, 1.4 g of "C10" (1,1-bis(4-hydroxyphenyl)decane), 25.2 g of DPC, and 100 µl of an aqueous solution of TMAH and NaOH ($2.5 \times 10^{-4}$ and 1.5×

$10^{-6}$ moles catalyst/mole bisphenol, respectively). Polymerization was carried out according to steps 1–4 of the scheme in Table 1. After the final reaction stage, butyl tosylate was added in a toluene solution as a quenching agent. The molar ratio of quencher to NaOH catalyst was 6:1. After an additional 5 minutes, the polymer was sampled from the reaction tube.

Example 2

Example 1 was repeated, except that the polymerization reaction was carried out according to steps 1–5 of the scheme in Table 1.

Examples 3 and 4

Example 1 was repeated, except that 22.3 g of BPA and 3.5 g of "C10" were used. For example 3, the viscosity profile was determined. For example 4, the melt volume index was measured.

Examples 5 and 6

Example 3 was repeated, except that the polymerization reaction was carried out according to steps 1–of the scheme in Table 1.

Example 7

Example 1 was repeated, except that 22.2 g of BPA and 2.8 g of "C06" (2,2-bis(4-hydroxyphenyl)-4-methylpentane) were used. Also, the polymerization reaction was carried out according to steps 1–5 of the scheme in Table 1.

Example 8

In this example, the "C10" homopolycarbonate (see Example 1) was prepared by an interfacial process. C10 material (31.2 g. 100 mmol), p-cumylphenol (1.06 g, 5 mole %), 120 ml methylene chloride, 90 ml of water and TEA (triethylamine) (150 µl, about 1.2 mol %) were placed in a 500 ml Morton flask. The pH of the mixture was adjusted to 10.5 with 50 wt % NaOH. Phosgene was added at 0.6 g/min, until 13.2 g (30 mole % excess) was delivered.

The reaction mixture was stirred until chloroformate was no longer present. The polymer solution was separated from the brine, and washed with aqueous hydrochloric acid (HCl). The product was then washed with water, and steam-crumbed in a blender. The Tg of the product was approximately 43° C. Its molecular weight was 58,300 (polystyrene standard).

Example 9

This example describes the preparation of a copolycarbonate based on bisphenol A and the C10 bisphenol described earlier. A melt polymerization technique was employed. The amount of C10 present was 5 mole %, based on total moles bisphenol.

A 1-liter glass melt polymerization reactor was passivated by acid washing, rinsing and drying overnight at 100° C. The reactor was then loaded with 214.90 g (1.003 mole) of diphenyl carbonate, 209.19 g (0.916 mole) of BPA, and 15.74 g (0.048 mol) of "C10". A 316 stainless steel helixing stirrer was suspended in the powder. 733 microliters of tetramethylammonium hydroxide, in the form of a 1.0 M aqueous solution, and 1447 microliters of sodium hydroxide, in the form of a 0.001 M aqueous solution, were added.

The vessel was then evacuated and purged with nitrogen three times. After being heated to 180° C., the reaction mixture melted. Upon complete melting, the mixture was allowed to thermally equilibrate for 5–10 minutes, after which stirring at 50 rpm was begun. The temperature was raised to 230° C., and the pressure reduced to 170 millibar, whereupon phenol began to distill from the reactor. After 60 minutes, polymerization was continued further, with the following temperature/pressure profile: 270° C./20 millibar (30 minutes); 290° C./3.5 millibar (30 minutes); and 310° C./0.3 millibar (45 minutes).

At the completion of polymerization, the reactor was restored to ambient pressure with nitrogen. The polymer was then stranded from the reactor and cooled, resulting in 182 g of product. The material was transparent and colorless. Its number average molecular weight (Mn) was 13000. Its weight-average molecular weight (Mw) was 37,100 (polystyrene standards). The Tg of the product was 136° C.

Example 10

This example describes the preparation of a homopolycarbonate, based on the C06 bisphenol defined above. The C06 material (27.0 g, 100 mmole) was placed in a 500 ml Morton flask, along with p-cumylphenol (1.27 g, 6 mole %), methylene chloride (90 ml), water (90 ml), and TEA (200 µL, about 1.6 mole %). The pH was adjusted to 10.5 with 50 wt %. NaOH. Phosgene was then added at 0.6 g/min, until 13.2 g (30 mole % excess) was delivered. The polymer solution was separated from the brine and washed with aqueous HCl. The solution was then washed with water, and steam-crumbed in a blender. The weight-average molecular weight (Mw) of the product was 51,500 (polystyrene standard). Its Tg was 129° C.

Example 11

This example describes the preparation of a homopolycarbonate, based on the C05 bisphenol (3,3-bis(4-hydroxyphenyl)pentane). The C05 material (12.8 g, 50 mmole) was placed in a 500 ml Morton flask, along with p-cumylphenol (0.48 g, 4.5 mole %), 90 ml methylene chloride (90 mL), water (90 mL), and TEA (100 µL, about 1.6 mole %). The pH was adjusted to 10.5 with 50 wt %. NaOH. Phosgene was added at 0.6 g/min, until 13.2 g (30 mole % excess) was delivered. The polymer solution was separated from the brine, and washed with aqueous HCl. The solution was then washed with water, and steam-crumbed in a blender. The weight-average molecular weight (Mw) of the product was 70,300 (polystyrene standard). Its Tg was 142° C.

The results for these examples are presented in Table 3 and FIG. 1. The table also includes four comparative samples. Sample 12 was a commercial polycarbonate material based on bisphenol A. It had a weight-average molecular weight of about 35,500 (polystyrene standard). Its Tg was 143° C. Sample 13 was another commercial polycarbonate material based on bisphenol A. It had a weight-average molecular weight of about 36,700 (polystyrene standard). Its Tg was 145° C.

Sample 14, also used for comparison, was a material made by a procedure very similar to that used for example 1. However, the amount of bisphenol A was increased to 24.7 g (no co-monomer was employed here). Moreover, steps 1–5 (rather than just steps 1–4) of the scheme of Table 2 were employed. The sample had a weight-average molecular weight of 44,400 (polystyrene standard).

Sample 15, again used for comparison, was a polycarbonate material prepared according to the following procedure: A stainless steel batch reactor was charged under nitrogen with 1357 g of BPA; 1376 g of DPC; 550 μl of an aqueous solution of TMAH (2.63 M; 2.45×10⁻⁴ moles catalyst/mole BPA)); and NaOH (1.59×10⁻² M; 1.5×10⁻⁶ moles catalyst/mole BPA). Polymerization was carried out according to steps 1–4 of Table 2. Approximately 1 kg of granulate-product was obtained, with excellent characteristics, i.e., it was transparent and colorless. The sample had a weight-average molecular weight of 35,300 (polystyrene standard).

Table 3 sets forth properties for the samples described in the examples:

time-temperature superposition principle. The data for the copolycarbonates were normalized to the zero shear rate-viscosity of the homopolymer sample at 250° C. The corresponding temperatures for the copolycarbonates are also depicted in the figure.

FIG. 1 demonstrates increased shear-thinning behavior for the copolycarbonates of this invention. Samples 1, 3 and 6 have viscosities which are 14%-lower and 38%-lower than that of sample 12, at $1.0 \times 10^4$ rad/s and $1.0 \times 10^5$ rad/s, respectively. (The samples are compared at constant zero shear rate (CZSR) viscosities).

TABLE 3

| Sample | Mw [kg/mole] (PS standards) | Tg [° C.] | MVI 250° C., 1.25 kg [ml/10 min] | Viscosity 250° C., 0 s⁻¹ [P] | Viscosity 350° C., 0 s⁻¹ [P] | Viscosity 350° C., 1250 s⁻¹ [P] | Water uptake data 24 h* [wt. %] | Water uptake data equil* [wt. %] | Water uptake data D* [cm²/s] | Cg [Brewsters] |
|---|---|---|---|---|---|---|---|---|---|---|
| 1 | 36.3 | 135 | | 3790 | 270 | 240 | | | | |
| 2 | 48.0 | 140 | 5.7 | | | | | | | |
| 3 | 27.6 | 119 | | 925 | 80 | 75 | | | | |
| 4 | 32.0 | 123 | 25.3 | | | | | | | |
| 5 | 35.3 | 128 | 15.9 | | | | | | | |
| 6 | 51.3 | 126 | | 7950 | 690 | 560 | | | | |
| 7 | 39.6 | 140 | | | | | | | | 72 |
| 8 | 58.3 | 43 | | | | | 0.04 | 0.085 | 6.10E − 08 | |
| 9 | 37.1 | 136 | | | | | | | | |
| 10 | 51.5 | 129 | | | | | | | | 60 |
| 11 | 70.3 | 142 | | | | | | | | |
| 12** | 35.5 | 143 | 12.5 | 4800 | 310 | 300 | | | | |
| 13** | 36.7 | 145 | 10.0 | 8230 | 1270 | 980 | 0.30 | 0.38 | 4.00E − 08 | 80 |
| 14** | 44.4 | 146 | 4.5 | | | | | | | |
| 15** | 35.3 | 143 | 11.8 | | | | | | | |

MVI = Melt Volume Index
Cg = Stress Optical Coefficient
* "24 h" = Water uptake after 24 hours
"equil" = Water uptake at which the sample is saturated
"D" = Diffusion coefficient
**Comparative samples The data of Table 3 show significant improvement in low water-uptake (e.g., compare sample 8 with comparative sample 13, showing decreased water uptake). Moreover, improved melt flow is demonstrated by comparing samples 2 and 5 with the comparative samples. As an illustration, the melt flow value of sample 5 is higher than that of comparative samples 12, 13 and 15, at similar molecular weights. (Increases in molecular weight generally increase the viscosity, and decrease the melt flow of polymers). In the present examples, the melt flow value of sample 2 is even higher than that of comparative sample 14, although the latter has a lower molecular weight. Moreover, lower viscosity is demonstrated by comparing sample 1 with comparative samples 12 and 13—all at similar molecular weights.

Furthermore, the samples based on the present invention generally possessed relatively low stress optical coefficients, which are indicative of low birefringence. As alluded to earlier, the latter characteristic is very desirable in the case of optical discs with high data-storage requirements. Low birefringence minimizes interference with the laser beam as the beam passes through the optical disc.

FIG. 1 is a graph depicting viscosity as a function of shear rate, for some of the polymeric samples described previously. (Sample 12 was the commercial polycarbonate material based on bisphenol A, outside the scope of this invention. Samples 1, 3 and 6 were based on copolycarbonates falling within the scope of the present invention.)

The curves in the graph were obtained by measuring the samples at different temperatures, and then applying a While preferred embodiments have been set forth for the purpose of illustration, the foregoing description should not be deemed to be a limitation on the scope of the invention. Accordingly, various modifications, adaptations, and alternatives may occur to one skilled in the art, without departing from the spirit and scope of the present invention.

All of the patents, articles, and texts mentioned above are incorporated herein by reference.

What is claimed:

1. A thermoplastic composition, comprising a copolycarbonate which includes both structural units

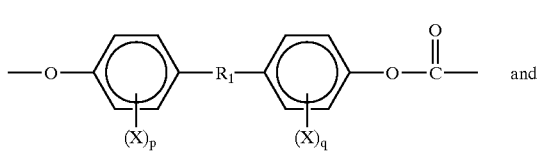

(I)

and

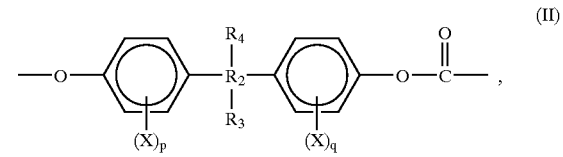

(II)

wherein $R_1$ is a divalent aliphatic, alicyclic, or phenyl-substituted alkylidene group; —O—, —S—, —SO—, —SO₂—, or CO;

R₂ is a bridging hydrocarbon group containing 1 to 3 carbon atoms;

each R₃ and R₄ is, independently, hydrogen or a branched or linear alkyl group containing 2 to about 40 carbon atoms; with the proviso that only one of the R₃ and R₄ groups can be hydrogen; and that one of the R₃ and R₄ groups must contain at least 2 carbon atoms;

each X represents, independently, a halogen atom or a lower alkyl group; and p and q are each, independently, 0 to 4.

2. The composition of claim 1, wherein R₁ is a hydrocarbon group.

3. The composition of claim 2, wherein R₁ is a saturated group selected from the group consisting of methylene, cyclohexylmethylene, 2-[2.2.1]-bicycloheptylmethylene; ethylene, isopropylidene, neopentylidene, cyclohexylidene, cyclopentadecylidene, cyclododecylidene, and adamantylidene.

4. The composition of claim 3, wherein structural unit I is bisphenol A carbonate.

5. The composition of claim 1, wherein R₂ is methylene.

6. The composition of claim 5, wherein at least one of R₃ and R₄ is an alkyl group containing about 2 to about 10 carbon atoms.

7. The composition of claim 5, wherein both R₃ and R₄ are unsubstituted.

8. The composition of claim 5, wherein structural unit II is a carbonate derived from a bisphenol selected from the group consisting of 3,3-bis(4-hydroxyphenyl)pentane; 1,1-bis(4-hydroxyphenyl)decane; 1,1-bis(4-hydroxyphenyl)-2-ethylhexane; 1,1-bis(4-hydroxyphenyl)nonane; and 1,1-bis(4-hydroxyphenyl)isononane.

9. The composition of claim 1, comprising at least about 30 molar percent of structural unit I, based on the total moles of structural unit I and structural unit II.

10. The composition of claim 9, comprising at least about 50 molar percent of structural unit I, based on the total moles of structural unit I and structural unit II.

11. The composition of claim 1, wherein the copolycarbonate has a molecular weight (weight average) in the range of about 10,000 to about 100,000.

12. The composition of claim 11, wherein the molecular weight is in the range of about 25,000 to about 40,000.

13. The composition of claim 1, wherein the copolycarbonate has an end-cap level of at least about 75%.

14. The composition of claim 13, wherein the end-cap level is at least about 85%.

15. The composition of claim 1, further comprising at least one additive selected from the group consisting of impact modifiers, antioxidants, nucleating agents, mineral fillers, thermal stabilizers, UV stabilizers; reinforcing fillers, flame retardants, colorants, and lubricants.

16. The composition of claim 1, wherein the copolycarbonate is prepared by a process selected from the group consisting of (A) melt polymerization, (B) interfacial polymerization, and (C) interfacial conversion to bischloroformates, followed by polymerization.

17. The composition of claim 16, wherein interfacial polymerization is carried out by reacting aromatic dihydroxy compounds and phosgene.

18. The composition of claim 16, wherein melt polymerization is carried out by reacting aromatic dihydroxy compounds and a carbonic acid diester.

19. The composition of claim 18, wherein the carbonic acid diester is diphenyl carbonate.

20. A thermoplastic composition, comprising a copolycarbonate derived from a combination of bisphenol A and a second bisphenol which includes hydrogen and a pendant branched or linear alkyl group attached to a hydrocarbon group having 1 to 3 carbon atoms that bridges the phenolic groups, wherein the branched or linear alkyl group contains 2 to about 10 carbon atoms.

21. The composition of claim 20, comprising at least about 50 molar percent of bisphenol A, based on the total moles of bisphenol A and the second bisphenol.

22. The composition of claim 20, wherein the second bisphenol is selected from the group consisting of 3,3-bis(4-hydroxyphenyl)pentane; and 1,1-bis(4-hydroxyphenyl)decane.

23. An article, comprising the thermoplastic composition of claim 1.

24. An optical disc for data storage, comprising the thermoplastic composition of claim 1.

25. A process for molding thermoplastic articles, comprising the following steps:

(a) forming a copolycarbonate resin which comprises both structural units

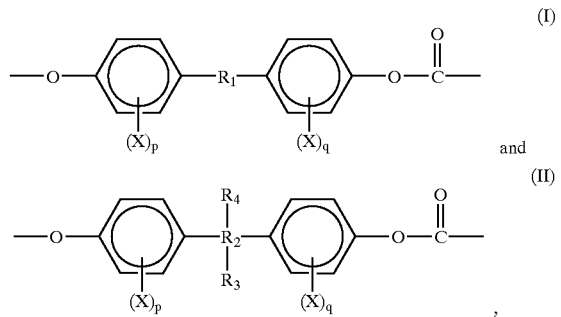

wherein R₁ is a divalent aliphatic, alicyclic, or phenyl-substituted alkylidene group; —O—, —S—, —SO—, —SO₂—, or CO;

R₂ is a bridging hydrocarbon group containing 1 to 3 carbon atoms;

each R₃ and R₄ is, independently, hydrogen or a branched or linear alkyl group containing 2 to about 40 carbon atoms; with the proviso that only one of the R₃ and R₄ groups can be hydrogen; and that one of the R₃ and R₄ groups must contain at least 2 carbon atoms;

each X represents, independently, a halogen atom or a lower alkyl group; and p and q are each independently 0 to 4; and then (b) molding an article from the copolycarbonate resin.

26. The process of claim 25, wherein step (a) is carried out by a technique selected from the group consisting of (A) melt polymerization, (B) interfacial polymerization, (C) solid state polymerization, and (D) interfacial conversion to bischloroformates, followed by polymerization.

27. The process of claim 25, wherein step (a) is carried out by reactive blending.

28. The process of claim 27, wherein the reactive blending is carried out in an extruder.

29. The process of claim 25, wherein step (b) is carried out by injection molding.

30. A thermoplastic composition, comprising a copolycarbonate which comprises both structural units (I) and (II), and characterized by a glass transition temperature of about 120° C. to about 185° C.;

a water absorption value of below about 0.33 weight %;

a melt flow value which is at least about 10% higher than a melt flow value for a copolycarbonate comprising only structural unit (I), at substantially the same molecular weight; and a melt viscosity value which is at least about 10% lower than the melt viscosity value for a polycarbonate comprising only structural unit (1), at a shear rate of at least about $1.0 \times 10^4$ rad/s, under the same constant zero shear rate (CZSR) conditions;

wherein structural unit (I) is

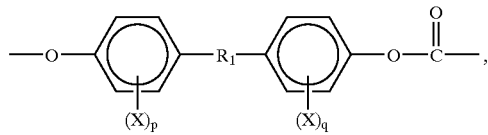

and structural unit (II) is

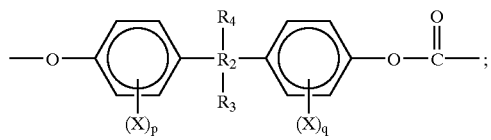

and $R_1$ is a divalent aliphatic, alicyclic, or phenyl-substituted alkylidene group; —O—, —S—, —SO—, —SO$_2$—, or CO;

$R_2$ is a bridging hydrocarbon group containing 1 to 3 carbon atoms;

each $R_3$ and $R_4$ is, independently, hydrogen or a branched or linear alkyl group containing 2 to about 40 carbon atoms; with the proviso that only one of the $R_3$ and $R_4$ groups can be hydrogen; and that one of the $R_3$ and $R_4$ groups must contain at least 2 carbon atoms;

each X represents, independently, a halogen atom or a lower alkyl group; and p and q are each independently 0 to 4.

31. The composition of claim 30, comprising at least about 50 molar percent of structural unit I, based on the total moles of structural unit I and structural unit II.

32. A thermoplastic composition, comprising a copolycarbonate which includes both structural units

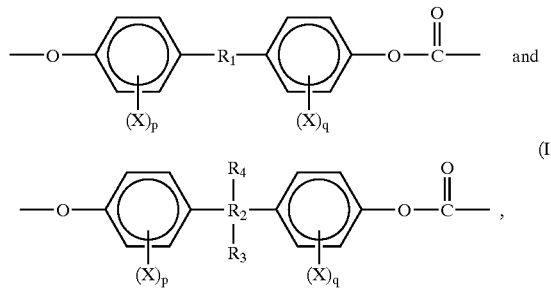

wherein $R_1$ is a divalent aliphatic, alicyclic group having at least 10 carbon atoms, or phenyl-substituted alkylidene group; —O—, —S—, —SO—, —SO$_2$—, or CO;

$R_2$ is a bridging hydrocarbon group containing 1 to 3 carbon atoms;

each $R_3$ and $R_4$ is, independently, hydrogen or a branched or linear alkyl group containing 2 to about 40 carbon atoms; with the proviso that only one of the $R_3$ and $R_4$ groups can be hydrogen; and that one of the $R_3$ and $R_4$ groups must contain at least 2 carbon atoms;

each X represents, independently, a halogen atom or a lower alkyl group; and p and q are each, independently, 0 to 4.

33. The composition of claim 32, wherein $R_1$ is a saturated hydrocarbon group selected from the group consisting of methylene, cyclohexylmethylene, 2-[2.2.1]-bicycloheptylmethylene; ethylene, isopropylidene, neopentylidene, cyclopentadecylidene, cyclododecylidene, and adamantylidene.

34. A thermoplastic composition, comprising a copolycarbonate having an end-cap level of at least about 75% and which includes both structural units

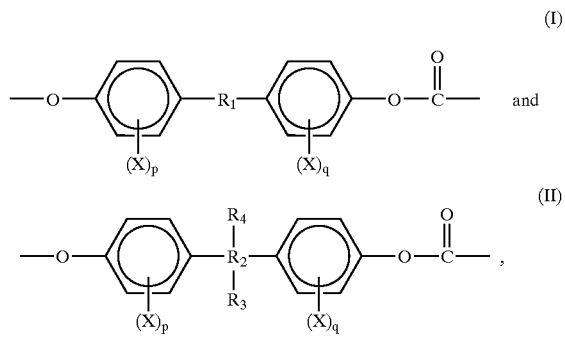

wherein $R_1$ is a divalent aliphatic, alicyclic, or phenyl-substituted alkylidene group; —O—, —S—, —SO—, —SO$_2$—, or CO;

$R_2$ is a bridging hydrocarbon group containing 1 to 3 carbon atoms;

each $R_3$ and $R_4$ is, independently, hydrogen or a branched or linear alkyl group containing 2 to about 40 carbon atoms; with the proviso that only one of the $R_3$ and $R_4$ groups can be hydrogen; and that one of the $R_3$ and $R_4$ groups must contain at least 2 carbon atoms;

each X represents, independently, a halogen atom or a lower alkyl group; and p and q are each, independently, 0 to 4.

* * * * *